United States Patent [19]

Klainos

[11] Patent Number: 4,621,915
[45] Date of Patent: Nov. 11, 1986

[54] MULTI-IMAGE CAMERA
[75] Inventor: Michael Klainos, Libertyville, Ill.
[73] Assignee: Identification Products Mfg. Co., Libertyville, Ill.
[21] Appl. No.: 680,627
[22] Filed: Dec. 10, 1984
[51] Int. Cl.⁴ .............................................. G03B 1/00
[52] U.S. Cl. .................................................... 354/121
[58] Field of Search ................ 354/120, 121, 123, 118
[56] References Cited

U.S. PATENT DOCUMENTS 689,994 12/1901 Spooner .............................. 354/121
3,935,580 1/1976 Klainos ............................... 354/121

Primary Examiner—William B. Perkey
Attorney, Agent, or Firm—Laff, Whitesel, Conte & Saret

[57] ABSTRACT

A multi-image instant of regular developing camera adapted to produce small photographs, such as those placed on personal identification cards, passes or the like. The camera sequentially takes exposures of up to six separate images on self developing photo-sensitive paper. The camera is provided with a lens turret consisting of a multi-lens disc rotatable about a central axis, and a shutter which, when actuated, permits light to pass through one of the lens apertures and expose selected portions of the photo-sensitive paper. The lens position and shutter actuation are controlled by a single rotating lever arm assembly, and a drive means.

5 Claims, 4 Drawing Figures

MULTI-IMAGE CAMERA

BACKGROUND

1. Field of the Invention

This invention relates to multi-image cameras, and more particularly, to multi-image cameras with a single rotating power source and lever arm assembly sequentially operating both the lens and shutter systems of the camera.

2. Brief Description of the Background Art

It has become quite common for individuals to be provided with identification cards containing their pictures. Many organizations, groups, benefit plans, and employers require members of the group or employees to have such identification cards.

With today's increasing photographic film and development costs, cameras have been developed which take a plurality of pictures on one film sheet. These cameras use an instant developing film i.e., Polaroid, and up to four pictures of either the same subject, or four separate subjects are exposed on the same film sheet. These pictures are immediately available and provide an easy and quick method of producing pictures for identification cards.

An example of an advanced design for a multi-image camera is the present inventor's U.S. Pat. No. 3,935,580, disclosing perhaps, nearly the current state of the art. Nonetheless, the historic rises in silver costs have made even quarter-frame exposure cameras, such as these, impracticably expensive for the large scale bulk useage for which these cameras were designed.

SUMMARY OF THE INVENTION

Accordingly, an object of this invention is to provide a multi-image camera which can take several pictures sequentially on a single sheet of photo-sensitive paper or film. More particularly, an object of the present invention is to provide a six image per frame camera to effectively reduce film and film related costs by one third.

An additional object is to produce a more efficient multi-image automatic camera without losing any expected or desireably convenient operating or safety features thereby.

A further object is to produce a more efficient multi-image camera with a minimum of parts, particularly an automated one-sixth frame exposure camera with no more assemblies or mechanisms than a typical automated quarter-frame exposure camera.

In a broad embodiment therefore, these objects and others are provided by an improved camera used to produce small photographs that are placed on identification cards, passes and the like. To this end, the lens and shutter systems of the disclosed embodiment of the camera are adapted to print six separate pictures on a single sheet of instant-developing film. The lens system consists of a multi-apertured disc or turret rotatable about a central axis. At least two lenses are found on the lens turret at different radii from the central axis. The shutter consists of a slideably mounted multi-apertured plate. Both the lens turret and the shutter are mounted on a mounting plate integral with the camera. Switching devices and a motor are provided to control the automatic operation of the camera. An important feature of the novel camera is the single power means and co-axial actuating arms and levers which control the various mechanical functions of the camera. A further important feature of the inventive camera is the lens turret comprising a plurality of lenses and lens apertures functionally positioned at different radii.

IN THE DRAWINGS

DETAILED DESCRIPTION OF THE INVENTION

Figure 1:
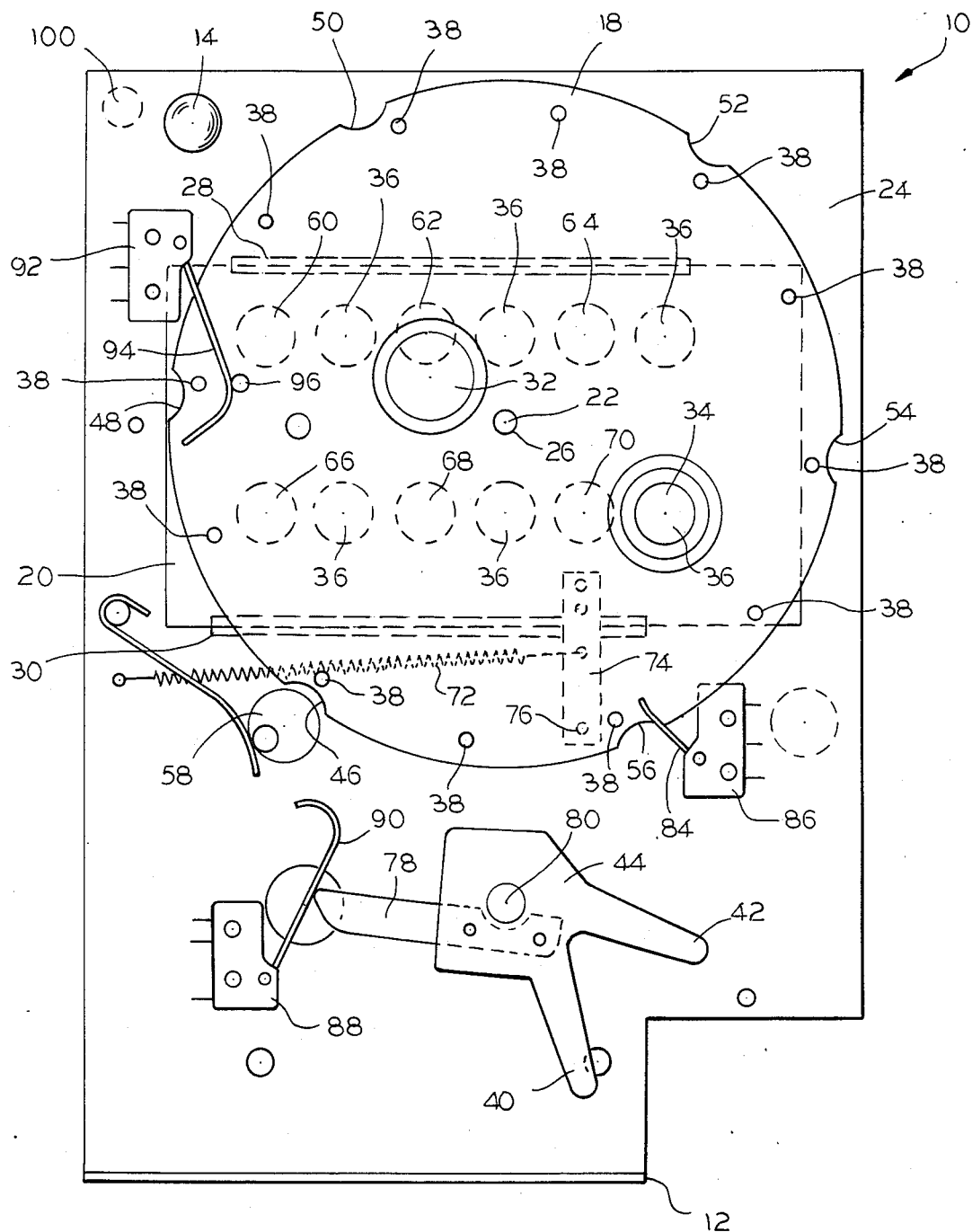
FIG. 1 is a front elevation view of the operating mechanism of the inventive multi-image camera with two lenses.
Figure 2:
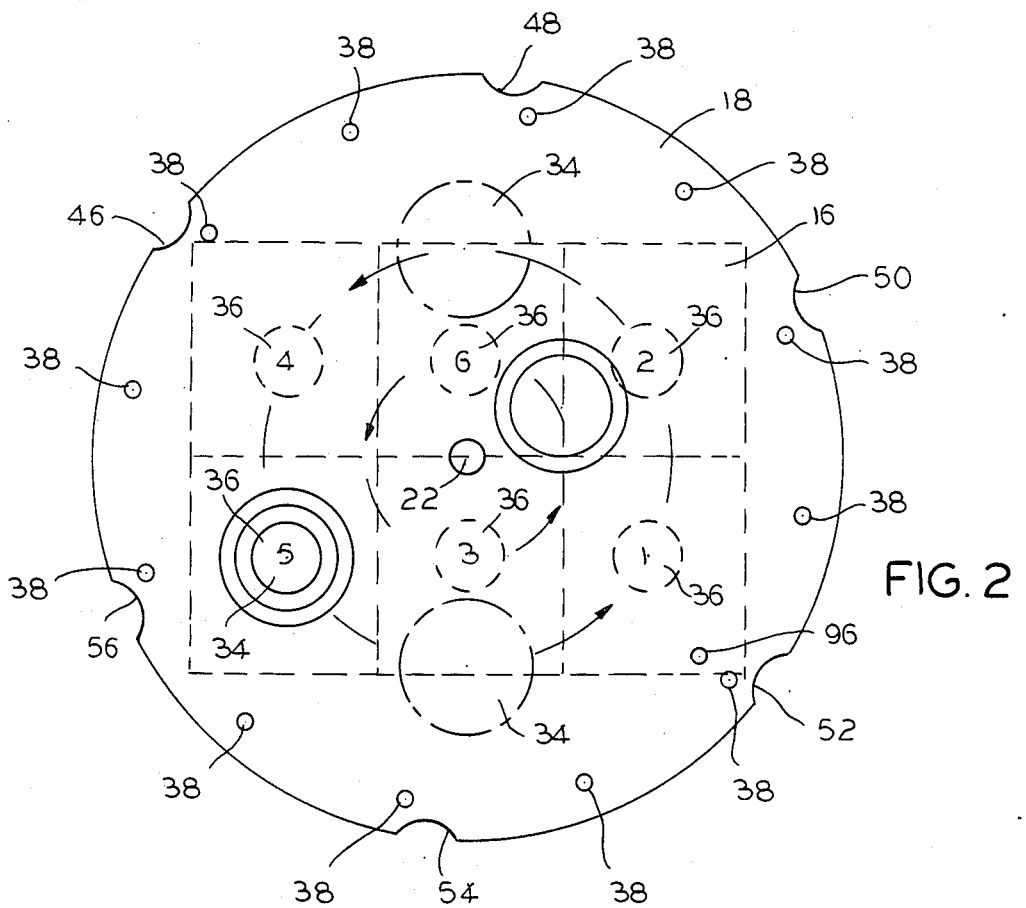
FIG. 2 is an illustration of the rotating motion of the apertured lens turret, showing a lens aperture in alignment with a shutter aperture, the shutter being displayed in a released configuration.
Figure 3:
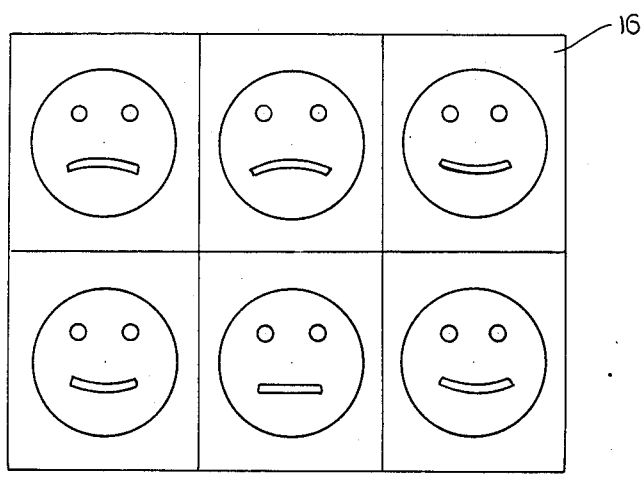
FIG. 3 is an example of a film-piece sequentially exposed by the present invention.

Referring now to the drawings there is shown in FIG. 1 the inventive multi-image camera 10 mounted within a housing 12, preferably made of rigid plastic, metal or any other suitable material. An instant developing film-holding adapter, i.e., Polaroid, is fixed to the rear of case 12, with a camera focusing spot lens 14 positioned in the camera front. Spot lens 14 provides a light beam for easy framing of the camera subject. The embodiment of the inventive camera 10 is adapted to take six pictures on a single sheet of film 16 (FIG. 2) lodged in the camera's film adapter by means of the cooperation between a rotating lens turret 18 and a sliding shutter plate 20. Lens turret 18 is rotatably mounted to housing 12 about pivot pin 22 secured to a mounting plate 24. Lens turret 18 is secured to pivot pin 22 by a retaining screw 26 threadingly inserted in pivot pin 22. Shutter sheet 20 is slidingly secured to mounting plate 24 by glide rails 28, 30 permanently affixed to mounting plate 24. Mounting plate 24 is rigidly affixed to housing 12 and includes six circular apertures 36 of equal diameter disposed behind shutter sheet 20, and which when opened by the shutter plate, permit light to expose one-sixth frame of film 16.

Lens turret 18 is disposed in front of the shutter plate 20 and in the disclosed preferred embodiment has two precisely located lens apertures 32, 34 extending therethrough. The disclosed apparatus is specifically designed to expose only one-sixth of the film at a time. The lens turret 18 illustrated, used for sequential one-sixth frame exposures, comprises two lens apertures 32, 34 each at different radial distances across from pivot pin 22. The one-sixth frame to be exposed is selected by appropriately positioning lens turret 18 such that a lens aperture 32, 34 is in alignment with only one of apertures 36 in mounting plate 24 as the lens turret is rotated, as will be explained. Thus, when the shutter 20 admits light through either lens apertures 32 or 34, only the sixth of film 16 directly behind mounting plate aperture 36 is exposed.

In the disclosed embodiment, lens turret 18 includes twelve rollpins 38 disposed equidistantly around the periphery thereof, which coact with lens turret operating arms 40, 42, forming part of lever arm assembly 44 (FIG. 1.), to rotate the lens turret 18 about pivot pin 22 as will be explained. The outer edge of the lens turret 18 comprises six equally spaced detents or grooves 46, 48, 50, 52, 54, 56 which cooperate with spring biased detent latch 58 to hold lens turret 18 in any one of six proper positions, whereby one of lens apertures 32 or 34 is necessarily in alignment adjacent one of mounting plate apertures 36.

Shutter plate 20 is located behind lens turret 18, and includes six shutter apertures 60, 62, 64, 66, 68, 70. Each shutter aperture is adapted to selectively open the mounting plate aperture 36 positioned behind either lens aperture 32 or 34. Shutter plate 20 is slideably mounted for reciprocation and is adapted to be displaced a short distance between a first position (FIG. 1) where apertures 60–70 do not align with apertures 36, and a second position (FIG. 2) whereby the shutter openings 60–70 are directly over the mounting plate openings 36. Spring means 72 biases shutter plate 20 toward the first, closed postion. It is apparant that by moving shutter plate 20 to the second position (to the right in FIG. 1), light is permitted to pass to film 16 through the single mounting plate aperture 36 located behind the aligned lens turret aperture 32 or 34. A shutter movement arm 74 extends downwardly from a lower portion of shutter plate 20. A shutter movement pin 76 is disposed outwardly from the lower end of shutter movement arm 74 and is adapted to be actuated by shutter operating arm 78, as will be explained. Shutter operating arm 78 is attached to and comprises a part of lever arm assembly 44.

A significant feature of the present invention is the provision of a single power means to sequentially actuate both the lens movement mechanism and the shutter operating mechanism. To this end, a lever arm assembly 44 is disposed beneath lens turret 18 and shutter plate 20, and is fixed for rotation with the end of a shaft 80 which is driven by a motor (not shown) at approximately 25 R.P.M. The lens turret is actuated by operating cam means comprising the two arms 40, 42 extending from the lever arm assembly 44, and shutter operating cam means comprising a single arm 78 also extending from lever arm assembly 44. It is apparent that both the lens turret operating arms 40, 42 and the shutter operating arm 78 are driven by a single power source or motor in one continuous, rotating motion. The relationship between the lens turret operating arms 40, 42 and shutter operating arm 78 is such that either lens aperture 32 or 34 is positioned adjacent a mounting plate aperture 36 prior to actuation of the shutter.

To operate the inventive multi-image camera 10, the lens, shutter, and lever arm assembly parts are initially in a mode as illustrated in FIG. 1. The operator turns switch 102 to "on" position and then depresses switches 82 and 100 (FIG. 4) simultaneously, which starts the motor and begins the rotation of the lever arm assembly 44 in a clockwise direction. The shutter operating arm 78 first engages the shutter movement pin 76 on the shutter movement arm 74, and moves shutter plate 20 to the right. This opens the apertures behind lens aperture 34 to the light which has previously been positioned in alignment with one of the mounting plate apertures 36, and exposes the first sixth of the film with the first picture.

As shaft 80 continues to rotate, shutter arm 74 moves to its furthest position to the right and trips operating lever 84 of micro-switch 86 to actuate flash device (not shown). Further clockwise rotation of lever arm assembly 44 allows shutter operating arm 78 to disengage itself from pin 76 of shutter arm 74, allowing the shutter 20 to return to its first position under the influence of shutter spring 72, thereby terminating the exposure. Exposure may be adjusted by varying the flash duration, or the lens aperture diameter.

At this point, an exposure in the first sixth of film 16 has been completed. As lever arm assembly 44 continues its clockwise rotation, lens turret operating arms 40 and 42 sequentially engage roll pins 38 on the periphery of lens turret 18, and rotate lens turret 18 in a counterclockwise direction until lens aperture 34 is aligned with the next aperture 36 in mounting plate 24. Shutter 20 is disposed again in its first position covering all mounting plate apertures 36, and no exposure of film 16 takes place. Lens turret 18 continues to rotate about pin 22 under the influence of operating arm 40 and then operating arm 42 until detent latch 58 engages one of lens turret detents 46–56 to hold lens turret 18 in proper position such that lens aperture 34 remains in aligment with a mounting plate aperture 36.

A second microswitch 88 with wand 90 is actuated when lens turret 18 is in its proper position. This is accomplished in the disclosed embodiment by shutter activating arm 78 which automatically opens microswitch 88 when lens turret 18 is properly oriented. Microswitch 88 functions to de-energize the motor rotating shaft 80, and thereby stops any further shaft movement. Thus, microswitch 88 functions as a safety switch to prevent an exposure from unintentionally taking place before the picture subject is properly situated. At this point, the device is ready to take the next picture.

The motor driving shaft 80 is reactivated by operator-controlled switch 82, which overrides switch 88. Switch 100 need not again be depressed because microswitch 92 is now closed. The previously described cycle repeats with the exposure taking place in the second sixth of film 16, and lens turret 18 subsequently rotates to a position whereby lens turret aperture 32 is adjacent a third sixth of the film 16.

Microswitch 92 is provided with operating lever arm 94. Lever arm 94 is engaged, opening switch 92 by double-exposure preventing pin 96 mounted on the reverse side of lens turret 18. Pin 96 engages lever arm 94 in response to one complete revolution of lens turret 18. Switch 92 (FIG. 4), when actuated by pin 96, locks the motor after all six pictures are taken. Switch 92 when activated, also energizes light 98 (FIG. 4) which indicates that all pictures having been taken, the motor is locked and the cycle is completed. Simultaneous engagement of operator-controlled switch 82 and operator-controlled switch 100 overrides microswitch 92, allowing continued use of camera 10 after fully-exposed film 16 has been replaced with unexposed film.

The relative position of lens apertures 32 and 34 in lens turret 18 are established to ensure that as turret 18 rotates to each of its six operating positions, only one of lens apertures 32 or 34 is directly over an aperture 36 in plate 24. The other lens aperture 32 or 34 will be located between a pair of apertures 36, such that no portion of any aperture 36 other than the one adjacent the frame of film 16 to be exposed is opened to the light.

Figure 4:
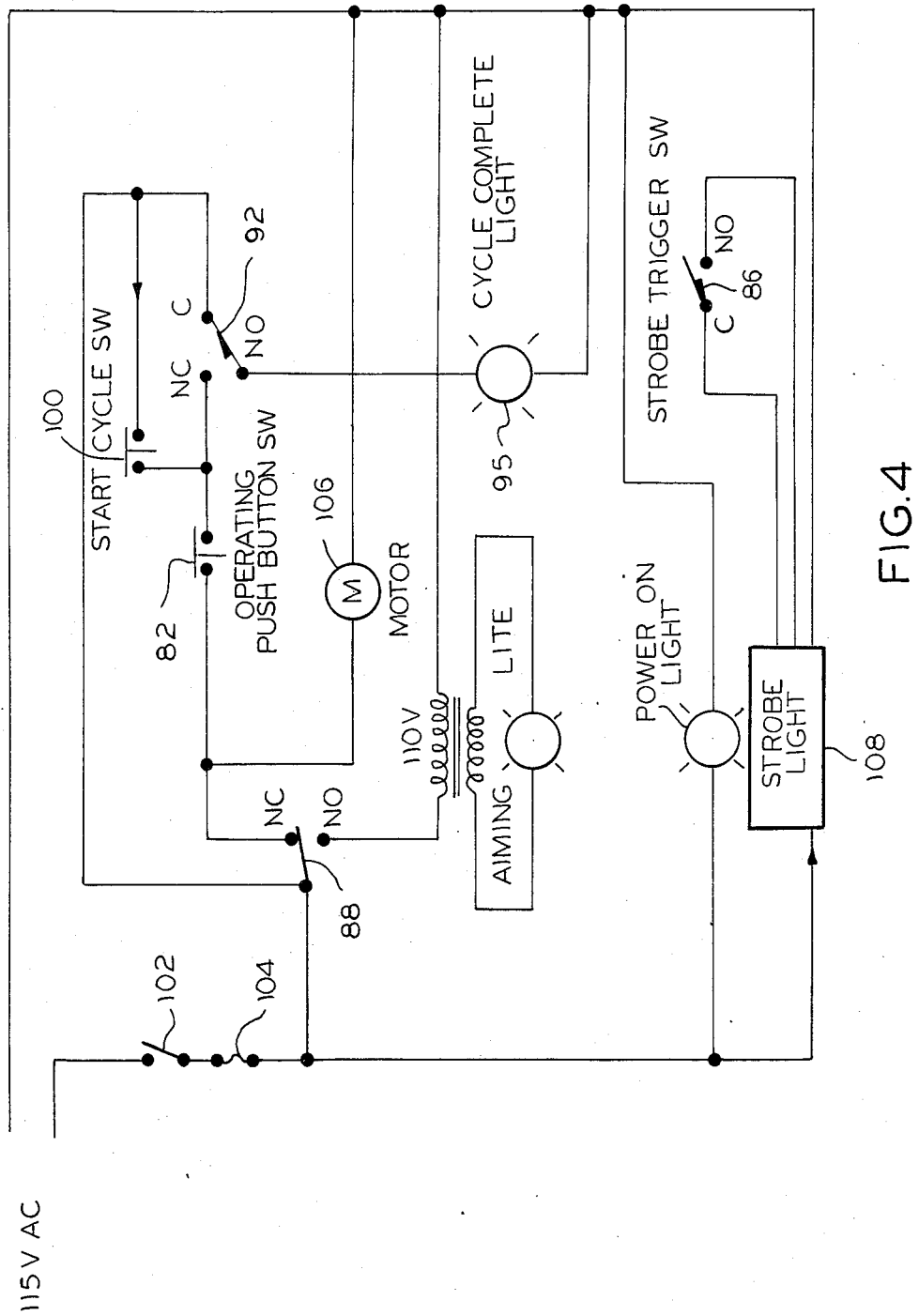
FIG. 4 is a schematic diagram showing the switch and control circuitry of the disclosed multi-image camera.

A schematic of the electrical circuitry of the novel multi-image camera at rest is illustrated in FIG. 4. As seen in the schematic, electricity from a 115 volt source passes an on-off switch 102, a fuse 104 and micro-switch 88 to approach start cycle switch 100. To activate the camera, the start cycle switch 100 and operating push button 82 are closed and electricity flows past microswitch 88, which is in its normal closed position, to activate the single power source or drive motor 106. Motor 106 when initially activated causes arm 78 to rotate in a clockwise direction and release lever 90 of switch 88, which now is in a normally closed position, and therefore there is no need to hold switches 82, 100. At this time the locking switch 92 is also deactivated to its normally closed position. Motor 106, upon continued movement, also causes lever arm assembly 44 to revolve in a clockwise direction, thus moving the shutter movement arm 74 to close micro-switch 86, which is normally open, thereby triggering strobe light 108, causing the strobe light to flash.

When micro-switch 92 is activated by pin 96 it closes normally open lever arm 94 and indicator light 95 is energized thereby. This conjuctive operation indicates that the cycle is complete (6 pictures taken on a single film), and that the camera is locked against further operation until the film with the six pictures taken is removed from the camera and replaced with fresh, unexposed film.

While the principles of the invention have been described above in connection with the specific apparatus and embodiments, it is to be understood that this description is made only by way of example and not as a limitation of the scope of the invention.

I claim:

1. A photographic automatic camera for sequentially exposing a plurality of areas on a single sheet of photosensitive film;
   said camera comprising a movable lens turret and a movable shutter plate mounted on one side of a mounting plate;
   said movable lens turret rotatably mounted to said mounting plate about a pivot pin extending through said lens turret and said mounting plate;
   said mounting plate having a plurality of apertures extending therethrough;
   said camera including means for holding said photosensitive film on the opposite side of said mounting plate;
   said lens turret having two lens apertures therein, each said lens aperture being located on said lens turret at a different radial distance from said pivot pin relative to one another, whereby said lens turret is movable to sequentially position only one of said two lens apertures adjacent one of said mounting plate apertures at a time;
   said shutter plate including a plurality of apertures extending therethrough, whereby said shutter plate is movable from a first position whereby said mounting plate apertures are closed by said shutter plate, to a second position whereby said shutter plate apertures are in alignment with said mounting plate apertures;
   said two lens apertures in said lens turret being located in said lens turret relative to each other whereby sequential rotational movement of said lens turret locates only one of said two lens apertures adjacent an aperture in said mounting plate while the remaining lens turret aperture is disposed adjacent the mounting plate, thereby preventing light from passing through the mounting plate apertures except the mounting plate aperture adjacent said one lens aperture when said shutter plate is in said second position;
   first actuating means adapted to move said lens turret into and out of said position including first engagement means operatively connected to said lens turret;
   second actuating means adapted to move said shutter plate from said first position to said second position;
   power means for operating both said first and second actuating means, said power means comprising a single power source drivingly connected to a lever arm assembly to sequentially operate said first and second actuating means;
   said lever arm assembly including lens operating cam means adapted to be operated by said power source to move said lens turret into and out of position to align said lens apertures with said mounting plate apertures;
   whereby said power means is adapted to move said shutter plate to said second position when one of said lens turret apertures is in alignment with one of said mounting plate apertures to expose said photosensitive film.

2. The camera of claim 1 whereby said second actuating means includes:
   second engagement means operatively connected to said shutter plate; and
   said lever arm assembly includes shutter operating cam means adapted to operate the second engagement means upon movement of said lever arm assembly by said power source, whereby said shutter plate is moved from said first position to said second position.

3. The camera of claim 2 wherein said lens operating cam means and said shutter operating cam means are disposed in spaced relation relative to each other, whereby said shutter operating cam means does not engage said second engagement means until after said lens operating cam means has engaged said first engagement means and rotated said lens turret into position aligning said lens turret apertures with said mounting plate apertures.

4. The camera of claim 1 wherein:
   said first engagement means includes a plurality of roller pins spaced around and extending laterally from the periphery of said lens turret;
   said lens operating cam means including a plurality of operating arms adapted to sequentially engage said roller pins upon movement of said lever arm assembly to rotate said lens turret.

5. The camera of claim 2 wherein:
   said second engagement means includes a shutter movement arm extending downwardly from said shutter plate; a shutter movement pin extending outwardly from said shutter movement arm; and said shutter operating cam means including a single shutter trip arm adapted to engage said shutter movement arm and actuate said shutter upon movement of said lever arm assembly.

* * * * *